(12) United States Patent
Miyake et al.

(10) Patent No.: US 7,072,522 B2
(45) Date of Patent: Jul. 4, 2006

(54) IMAGE PROCESSING APPARATUS AND METHOD

(75) Inventors: Nobutaka Miyake, Kanagawa (JP); Kiyoshi Umeda, Kanagawa (JP); Minoru Kusakabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

(21) Appl. No.: 10/246,536

(22) Filed: Sep. 19, 2002

(65) Prior Publication Data
US 2003/0059084 A1 Mar. 27, 2003

(30) Foreign Application Priority Data
Sep. 26, 2001 (JP) ............................. 2001-293854

(51) Int. Cl.
*G06K 9/38* (2006.01)
*G06K 9/00* (2006.01)

(52) U.S. Cl. ...................................... 382/252; 382/162
(58) Field of Classification Search ................ 382/100, 382/162, 172, 232, 237, 251, 252, 190; 358/1.9, 358/3.03, 3.04, 3.05, 426.1, 465, 466, 534, 358/536, 539; 347/254
See application file for complete search history.

(56) References Cited

U.S. PATENT DOCUMENTS

| | | | |
|---|---|---|---|
| 5,465,161 A | | 11/1995 | Funada et al. |
| 6,437,817 B1 * | | 8/2002 | Ohta et al. ................. 347/254 |
| 6,563,957 B1 * | | 5/2003 | Li et al. ..................... 382/252 |
| 2001/0021275 A1 * | | 9/2001 | Nose ........................ 382/252 |
| 2002/0054308 A1 * | | 5/2002 | Tanaka et al ............... 358/1.9 |
| 2002/0054396 A1 * | | 5/2002 | Tanaka et al. .............. 358/519 |
| 2002/0080027 A1 * | | 6/2002 | Ohta et al. ................. 347/254 |
| 2003/0058480 A1 * | | 3/2003 | Miyake et al. ............. 358/426.1 |
| 2003/0059084 A1 * | | 3/2003 | Miyake et al. ............. 382/100 |

FOREIGN PATENT DOCUMENTS

| | | |
|---|---|---|
| EP | 0 642 060 A2 | 3/1995 |
| EP | 1 041 814 A2 | 10/2000 |
| EP | 1 102 474 A2 | 5/2001 |
| JP | 4-294682 | 10/1992 |
| JP | 7-123244 | 5/1995 |
| JP | 2640939 | 5/1997 |
| JP | 2777800 | 5/1998 |
| JP | 2000-287062 | 10/2000 |
| JP | 2001-148778 | 5/2001 |

* cited by examiner

*Primary Examiner*—Amir Alavi
(74) *Attorney, Agent, or Firm*—Fitzpatrick, Cella, Harper & Scinto

(57) ABSTRACT

The invention provides a method of burying additional information in an image, which can suppress deterioration of image quality and reduce an extraction error rate when extracting the additional information. For implementing the method, in an image processing apparatus for burying predetermined information in a color image, the apparatus comprises an input unit for inputting a color image; a quantizing unit for quantizing the input color image with an error diffusion process for each of predetermined color components; and a quantizing condition control unit for controlling, in accordance with the predetermined information, periodicity at which an amplitude of a quantizing threshold is modulated by the quantizing unit. The quantizing condition control unit controls a phase in the amplitude modulation of the quantizing threshold to be different between at least one of the color components and the other color components.

7 Claims, 16 Drawing Sheets

FIG. 8A

| 3 | 3 | 2 | 2 | 1 | 1 | 0 | 0 |
|---|---|---|---|---|---|---|---|
| 2 | 2 | 1 | 1 | 0 | 0 | 3 | 3 |
| 1 | 1 | 0 | 0 | 3 | 3 | 2 | 2 |
| 0 | 0 | 3 | 3 | 2 | 2 | 1 | 1 |
| 3 | 3 | 2 | 2 | 1 | 1 | 0 | 0 |
| 2 | 2 | 1 | 1 | 0 | 0 | 3 | 3 |
| 1 | 1 | 0 | 0 | 3 | 3 | 2 | 2 |
| 0 | 0 | 3 | 3 | 2 | 2 | 1 | 1 |

FIG. 8B

| 0 | 3 | 2 | 1 | 0 | 3 | 2 | 1 |
|---|---|---|---|---|---|---|---|
| 0 | 3 | 2 | 1 | 0 | 3 | 2 | 1 |
| 1 | 0 | 3 | 2 | 1 | 0 | 3 | 2 |
| 1 | 0 | 3 | 2 | 1 | 0 | 3 | 2 |
| 2 | 1 | 0 | 3 | 2 | 1 | 0 | 3 |
| 2 | 1 | 0 | 3 | 2 | 1 | 0 | 3 |
| 3 | 2 | 1 | 0 | 3 | 2 | 1 | 0 |
| 3 | 2 | 1 | 0 | 3 | 2 | 1 | 0 |

FIG. 10A

|   |   |   | -1 | -1 |
|---|---|---|----|----|
|   | -1 | -1 | 2 | 2 |
| -1 | 2 | 2 | -1 | -1 |
| 2 | -1 | -1 |   |   |
| -1 |   |   |   |   |

FIG. 10B

|   |   | -1 | 2 | -1 |
|---|---|----|---|----|
|   |   | -1 | 2 | -1 |
|   | -1 | 2 | -1 |   |
|   | -1 | 2 | -1 |   |
| -1 | 2 | -1 |   |   |

IMAGE PROCESSING APPARATUS AND METHOD

BACKGROUND OF THE INVENTION

1. Field of the Invention

The present invention relates to an image processing apparatus and an image processing method.

2. Description of the Related Art

Hitherto, researches have been extensively conducted on techniques for multiplexing, in information of an image, other information related to the image.

Recently, the so-called watermarking technology has been standardized. With the watermarking technology, additional information, e.g., the author name and note on permission of use, is multiplexed in image information, such as photographs and paintings, in a manner hard to discern visually, and the multiplexed information is circulated over a network such as the Internet.

As another application field, for the purpose of preventing fraudulent forging of paper money, stamps, stocks and bonds, etc., improved high quality of image output devices, such as printers, require a technique of burying additional information in an image to specify the output device and the body number thereof from the image printed out on paper.

For example, Japanese Patent Laid-Open No. 7-123244 proposes a technique for realizing multiplexing of information by burying additional information in a high-frequency range of a color-difference component and a saturation component in which visual sensitivity is low.

However, the above-proposed technique has problems given below.

FIG. 13 shows a general manner of burying additional information with the watermarking technology. Image information A and additional information B are multiplexed in an adder 1301 and changed to multiplexed information C. FIG. 13 shows an example in which additional information is multiplexed in a real space area of image information. If the multiplexed information C can be circulated without being subjected to image processing, e.g., various kinds of filtering, and coding, e.g., irreversible compression, it is easy to demultiplex the multiplexed information C so as to restore the additional information B with conventional techniques. Image information circulated over the Internet can be demultiplexed even after being subjected to digital filtering for improvement of image quality, such as edge emphasis and smoothing, if the circulated information has a certain level of noise durability.

It is here assumed that a multiplexed image is printed by an output device, e.g., a printer, and additional information is taken out of a resulting print. It is also assumed that the used printer provides a printer output with an expression capability of just two or several gradations per color. Recently, an ink jet printer has been commercialized which is able to express an image in several gradations per color by employing ink with a thinner dye concentration and/or by variably controlling the size of output dots. Even with such an ink jet printer, however, it is impossible to express an image in gradations comparable to those of a photograph unless the so-called pseudo gradation process is employed.

More specifically, on the above-described assumption that an image is printed out by a printer using the multiplexing method based on the watermarking technology shown in FIG. 13, the multiplexed information C is changed to quantized information D through a pseudo gradation process 1401, as shown in FIG. 14. Then, the quantized information D is printed on paper with printer output 1402, thus resulting in on-paper information (print) E that is greatly deteriorated.

In other words, for restoring the additional information from the information printed on paper to prevent the above-mentioned forging, it is required to extract the additional information B from the on-paper information E obtained after a series of processes shown in FIG. 14. Because an amount by which information is changed through both the processes 1401, 1402 is very large, it is quite difficult to multiplex additional information in a visually indiscernible manner and to properly demultiplex the multiplexed additional information from the information printed out on paper.

Furthermore, FIG. 15 shows an example of the conventional watermarking technology in which image information is converted to frequency-range information using the Fourier transform, for example, and additional information is superimposed on a high-frequency range instead of the actual space area.

Referring to FIG. 15, image information is converted to frequency-range information by an orthogonal transformation process 1501, and additional information is added by an adder 1502 in a particular frequency range that is hard to discern visually. The multiplexed information is returned again to an actual space area through an inverse orthogonal transformation process 1503. Then, as with the related art of FIG. 14, the multiplexed information is subjected to filtering that entails great changes in information, i.e., a pseudo gradation process and printer outputting.

FIG. 16 shows a process of separating additional information from on-paper information. More specifically, information of a print is input through a scanner inputting process 1601. Since the input information is an image gradated with the pseudo gradation process, it is subjected to a gradation restoring process 1602, i.e., an inverse pseudo gradation process. The gradation restoring process 1602 is generally performed using an LPF (low-pass filter). The restored information is subjected to orthogonal transformation through an orthogonal transformation process 1603, and thereafter the buried additional information is separated in a separating process 1604 based on electric power in a particular frequency range.

As seen from FIGS. 15 and 16 described above, a number of complicated processes must be passed to achieve a series of steps from multiplexing of the additional information to separation thereof. In the case of a color image, a color converting process for conversion to a color specific to a printer must be included in such a series of processing steps. To satisfactorily separate the additional information that has been subjected to those complicated processes, a signal having very high durability must be input. It is however difficult to input a highly durable signal while maintaining satisfactory image quality. Also, the necessity of a number of complicated processes means that a very long processing time is required to achieve the series of steps from multiplexing to separation of the additional information.

In the above-cited Japanese Patent Laid-Open No. 7-123244, additional information is added to a high-frequency range as described above. However, when error diffusion is performed in the pseudo gradation process in a later stage, the band of the additional information is buried in a texture band generated with the error diffusion because of characteristics of a high-pass filter specific to the error diffusion. This possibly results in a risk that demultiplexing of the additional information may be failed. Also, a scanner with a very high accuracy is required for the demultiplexing of the additional information.

Thus, assuming the pseudo gradation process to be executed, the conventional methods shown in FIGS. 14 and 15 are not suitable. In other words, a method of multiplexing additional information is required which sufficiently takes into consideration characteristics of the pseudo gradation process.

Japanese Patent Nos. 2640939 and 2777800 propose examples in which multiplexing of additional information and redundancy of the pseudo gradation process are combined with each other.

With the former Japanese Patent No. 2640939, in a process of binary-coding using a systematic dithering method, data is mixed in an image signal by selecting one of dither matrices that represent the same gradation.

In the case using the systematic dithering method, however, it is difficult to print out an image with high quality comparable to a photographic unless a printer having high resolution and very excellent mechanical accuracy is employed. The reason is in that a slight deviation in mechanical accuracy causes low-frequency noises in the form of streaks, for example, and those noises are visually perceived on paper with ease.

Also, when the dither matrix is cyclically changed, the band of particular frequency generated by a regularly arrayed dither is disturbed and image quality is adversely affected.

Further, the gradation expressing capability is greatly different depending on the type of dither matrix. On paper, particularly, a change of area rate due to, e.g., overlaps between dots, differs depending on the dither matrix. Even in an area where density is uniform in terms of signal, therefore, a density change may occur upon switching of the dither matrix.

Moreover, a possibility of false demultiplexing is very high when the demultiplexing (separating) side employs a demultiplexing method that must estimate which dither matrix was used for binary-coding, in a state where a pixel value of image information as an original signal is uncertain.

The above-cited latter Japanese Patent No. 2777800 proposes a method of multiplexing additional information with color dither patterns based on arrays of those patterns. In this proposed method, deterioration of image quality is unavoidable upon switching of the dither pattern as with the above-described former proposal. Further, comparing with the former proposal, a larger quantity of additional information can be multiplexed, but color changes are caused with changes in array of color components and deterioration of image quality is increased particularly in a flat portion. Additionally, it is thought that demultiplexing of on-paper information is more difficult to achieve.

Anyway, those proposed methods of changing the dither matrix has the problem in that deterioration of image quality is serious, while demultiplexing is comparatively difficult.

In view of the above-stated situations in the art, the applicant of this application has proposed, in Japanese Patent Laid-Open No. 2000-287062, a method of burying codes by artificially creating a combination of quantized values, which are not generated with the usual pseudo gradation process, with the aid of a texture generated with the error diffusion process.

With that proposed method, since the texture shape is just a little changed microscopically, image quality is not deteriorated from the point of visual sense. Also, by employing a method of changing a quantizing threshold in the error diffusion process, a density value of area gradation is also maintained from the point of visual sense. Therefore, multiplexing of different types of signal can be very easily realized.

In the above-proposed method, however, whether the texture is an artificial one or not must be determined on the demultiplexing side. In the case of a print obtained by printing out information on paper, the texture cannot be sometimes satisfactorily reproduced because of deviations from the desired impact positions of ink droplets, e.g., dot twists.

For a color image, there is mainly practiced a method of multiplexing additional information in a color component that has the lowest sensitivity from the point of visual sense. However, determining a texture in an actual space area is easily affected by other color components, and a difficulty arises in separating the multiplexed information.

Further, to overcome the above-mentioned problem, the applicant of this application has proposed, in Japanese Patent Laid-Open No. 2001-148778, etc., a method of modulating the amplitude of a quantizing threshold itself in the error diffusion process at predetermined periodicity, controlling the periodicity of the threshold modulation in plural kinds for each unit area, thereby controlling the probability of occurrence of quantized values in the pseudo gradation process, and burying codes based on that periodicity.

Comparing with the aforementioned method of determining the texture position and shape, such a proposed method can realize more satisfactory demultiplexing of information printed out on paper because an important factor for the multiplexing is provided by information of relative electrical power between a plurality of predetermined frequency bands instead of phase information that forms codes.

In that proposed method, however, processing conditions for each color component in the pseudo gradation process are not disclosed regarding specific correlation between colors. Thus, there is still a demand for further improvements in a method of reducing, from the point of visual sense, noises caused with the process of burying additional information in printed-out information on paper, and a method of reducing an extraction error rate when extracting the additional information.

SUMMARY OF THE INVENTION

With the view of overcoming the above-mentioned problems in the art, it is an object of the present invention to provide an image processing apparatus and an image processing method, which can bury information while suppressing deterioration of image quality and increasing extraction accuracy of the information.

To achieve the above object, the present invention provides an image processing apparatus for burying predetermined information in a color image, the apparatus comprises an input unit for inputting a color image; a quantizing unit for quantizing the input color image with an error diffusion process for each of predetermined color components; and a quantizing condition control unit for controlling, in accordance with the predetermined information, periodicity at which an amplitude of a quantizing threshold is modulated by the quantizing unit, the quantizing condition control unit controlling a phase in the amplitude modulation of the quantizing threshold to be different between at least one of the color components and the other color components.

Further objects, features and advantages of the present invention will become apparent from the following description of the preferred embodiments with reference to the attached drawings.

BRIEF DESCRIPTION OF THE DRAWINGS

FIGS. 8A and 8B show examples of a phase table.

FIGS. 10A and 10B show examples of spatial filters shown in FIG. 9.

DESCRIPTION OF THE PREFERRED EMBODIMENTS

Preferred embodiments of the present invention will be described below in detail with reference to the drawings. Note that an image processing system according to the preferred embodiment is primarily incorporated, as an efficient implementation manner, in the form of printer driver software or application software, which is installed in a computer for creating image information to be output to a printer engine, but it is also effective to incorporate the system as hardware or software in a main unit of a copying machine, a facsimile, a printer, etc.

First Embodiment

Figure 1:
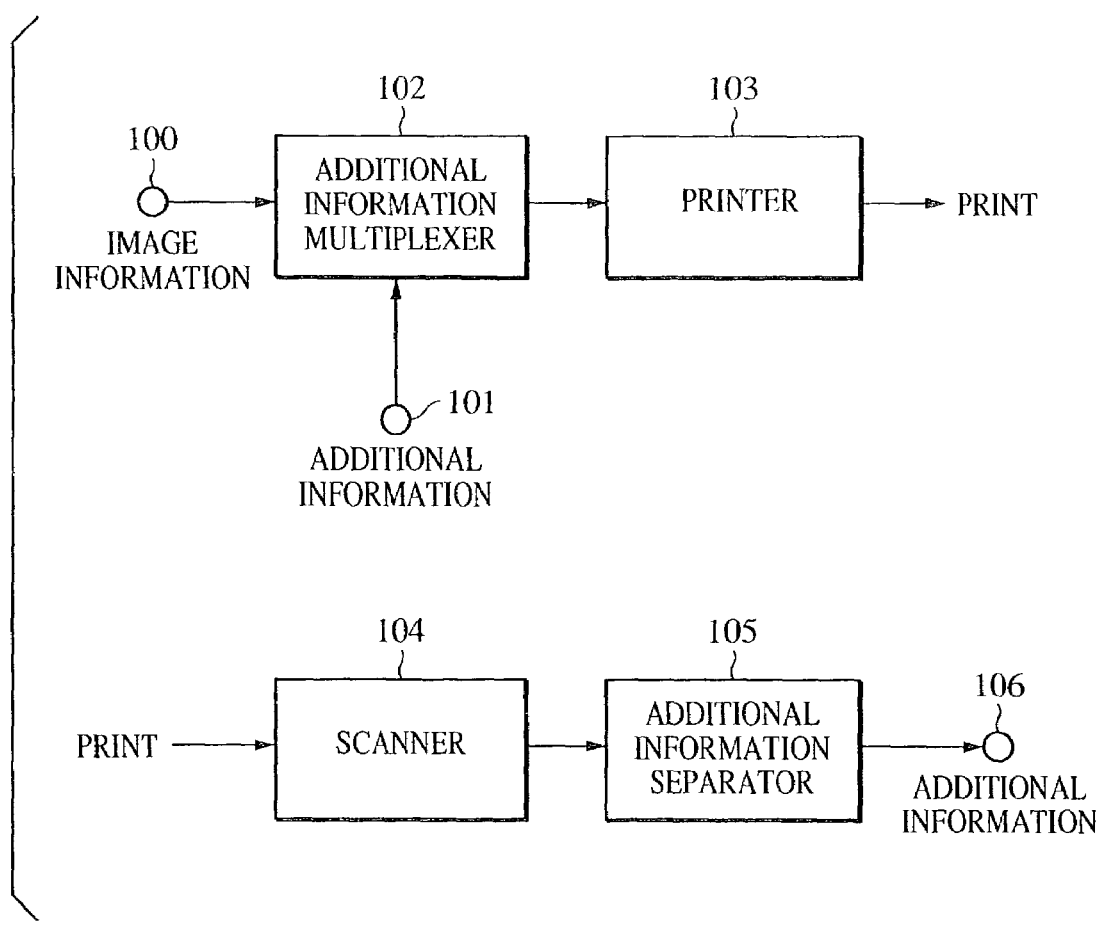
FIG. 1 is a block diagram showing an image processing system according to a first embodiment of the present invention.

FIG. 1 is a block diagram showing a configuration of an image processing system according to a first embodiment of the present invention.

The system has input terminals 100 and 101. Image information of multi-gradations is input through the input terminal 100, and additional information to be buried in the image information is input through the input terminal 101. The additional information may be any of various items of information, e.g., voice information and text information that are independent of the image information input through the input terminal 100, and the copyright, the photographing date and place, the photographer, etc. regarding the image information input through the input terminal 100, as well as utterly different image information.

Also, the system has an additional information multiplexer 102 for burying additional information in the image information in a manner hard to discern visually. The additional information multiplexer 102 has the functions of not only multiplexing the additional information, but also quantizing the input image information of multi-gradations.

Further, the system has a printer 103 for outputting information created by the additional information multiplexer 102 using a printer engine. The printer 103 is assumed to be an ink jet printer, a laser printer or the like, which realizes gradation expression through a pseudo gradation process.

For a print output from the printer, information on the print is read by a scanner 104. The additional information buried in the print is separated (extracted) by an additional information separator 105 and then sent to the output terminal 106.

Figure 2:
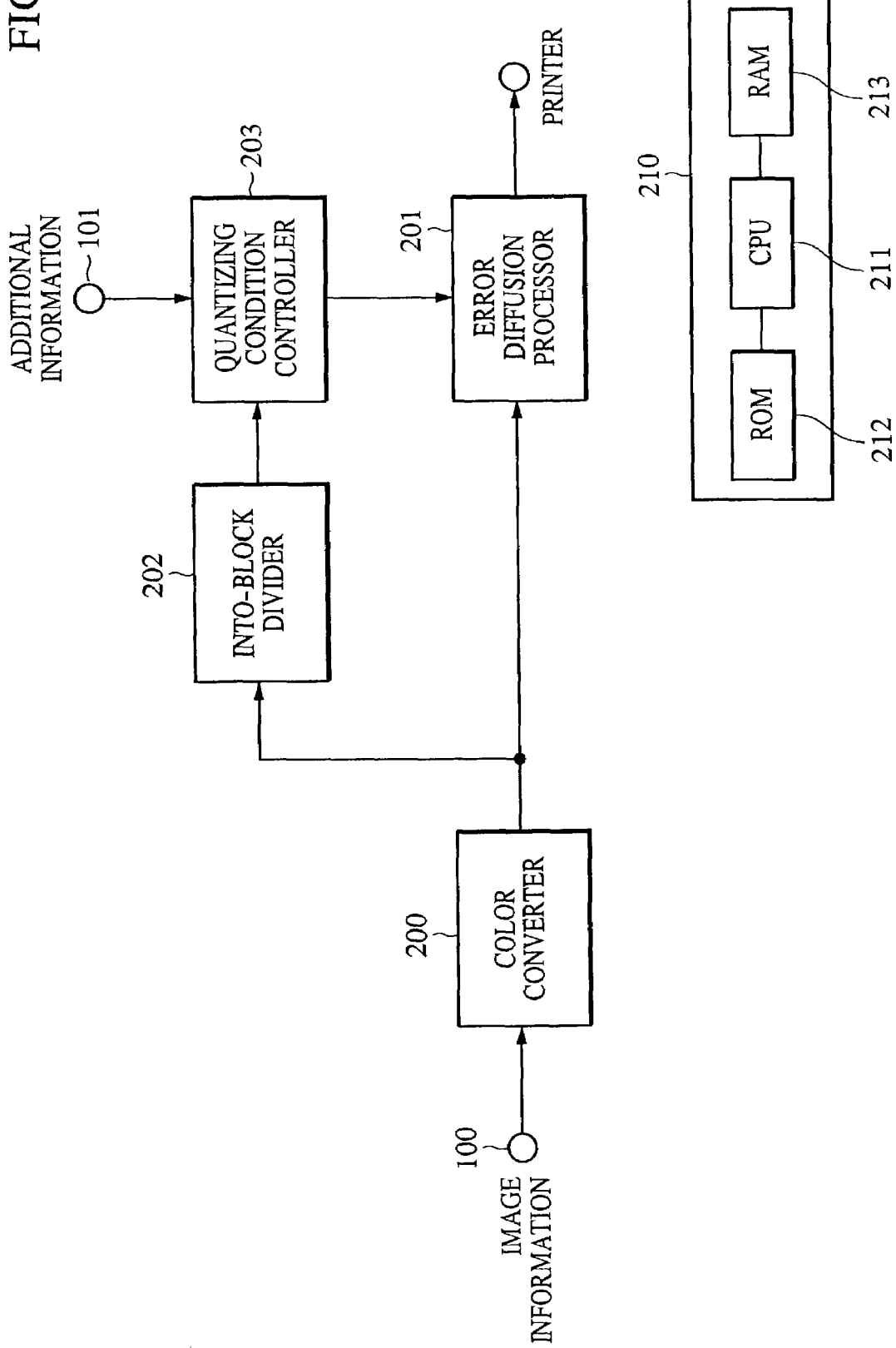
FIG. 2 is a block diagram showing an additional information multiplexer in FIG. 1.

FIG. 2 is a block diagram showing the additional information multiplexer 102 in FIG. 1.

Reference numeral 200 denotes a color converter for converting a color space of the input image information. It is here assumed that the input image information is information made up of RGB luminance components, and the color converter 200 performs conversion to density signals of respective ink colors to be recorded by the printer. The conversion from luminance signals to the density signals of respective ink colors can be performed using a lookup table or approximation formulae, and it is not limited to a particular method herein.

Numeral 201 denotes an error diffusion processor for executing a pseudo gradation process of the converted density signal with an error diffusion process. In other words, the converted density signal is converted using quantization levels less than the number of input gradations, and the gradation is represented in terms of area using a quantized value for plural pixels. The error diffusion process will be described later in detail.

Numeral 202 denotes an into-block divider for dividing the input image information in units of a predetermined area (block). The divided block may be a rectangular or any other suitable shape.

Numeral 203 denotes a quantizing condition controller for controlling and changing a quantizing condition in units of block area divided by the into-block divider 202.

Stated otherwise, the quantizing condition controller 203 controls the quantizing condition in units of block in accordance with the additional information input through the input terminal 101.

Numeral 210 denotes a control unit comprising a CPU 211, a ROM 212, a RAM 213, etc. The CPU 211 controls the operation and processing of each of the above-described components in accordance with control programs stored in the ROM 212. The RAM 213 serves as a working area for the CPU 211.

Figure 3:
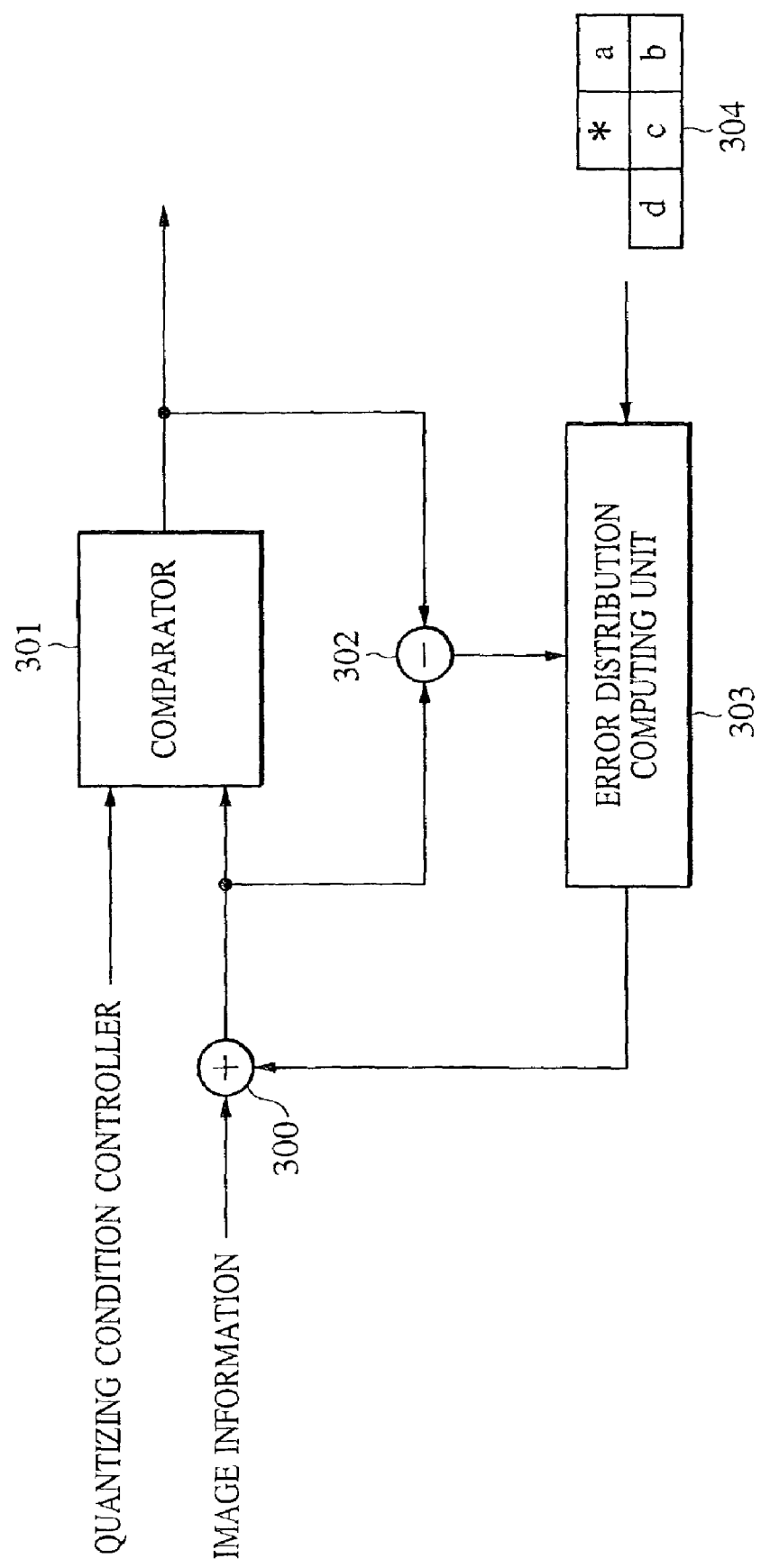
FIG. 3 is a block diagram showing a principal part of an error diffusion processor in FIG. 2.

FIG. 3 is a block diagram showing details of a principal part of the error diffusion processor 201. The following description is made, by way of example, of the error diffusion process using a binary quantized value. Note that the quantized value is not limited to a binary one, but may be of a ternary, quaternary or any other multi-value.

An adder 300 adds, per color, a target pixel value of the density signal of the image information and a binary-coded quantization error distributed to peripheral pixels. A comparator 301 compares a quantizing threshold from the quantizing condition controller 203 with a result of the addition of the target pixel value and the quantization error. The comparator 301 outputs "1" if the added result is greater than the predetermined threshold, and "0" if otherwise. For example, when the pixel gradation is expressed with 8-bit accuracy, it is generally expressed using "255" as a maximum value and "0" as a minimum value. It is here assumed that when the quantized value is "1", a dot (formed of ink, toner or the like) is printed on paper.

A subtracter 302 calculates an error between the quantization result and the addition result from the adder 300, and an error distribution computing unit 303 distributes errors to peripheral pixels which will be next subjected to the quantizing process. The error distribution is performed by preparing an error distribution table 304 in advance, which has been experimentally set depending on the distance relative to the target pixel, and distributing respective errors in accordance with a distribution ratio put in the distribution table.

A distribution table 304 shown in FIG. 3 indicates a table for distribution to four peripheral pixels, but usable distribution tables are not limited to the shown one.

The overall operation including the quantizing condition controller 203 will be described below with reference to a flowchart of FIG. 4. While the following description is made in connection with an example using a binary quantized value, the quantized value is not limited to a binary one, but may be of a ternary, quaternary or any other multi-value.

In step S401, a variable i is initialized. The variable i is a variable counting an address in the vertical direction.

In step S402, a variable col is initialized. The variable col is a variable indicating the number of colors constituting color components. While the operation is described, by way of example, in connection with a linear sequential process for processing respective color components for each main-scan line, any other suitable sequential process, such as a point or plane sequential process, can be also employed.

In step S403, a variable j is initialized. The variable j is a variable counting an address in the horizontal direction. Subsequent S404 is a determining step based on the address values of i, j. In this step S404, it is determined whether the coordinates i, j indicating the current processing address belong to an area in which a multiplexing process is to be executed.

Figure 5:
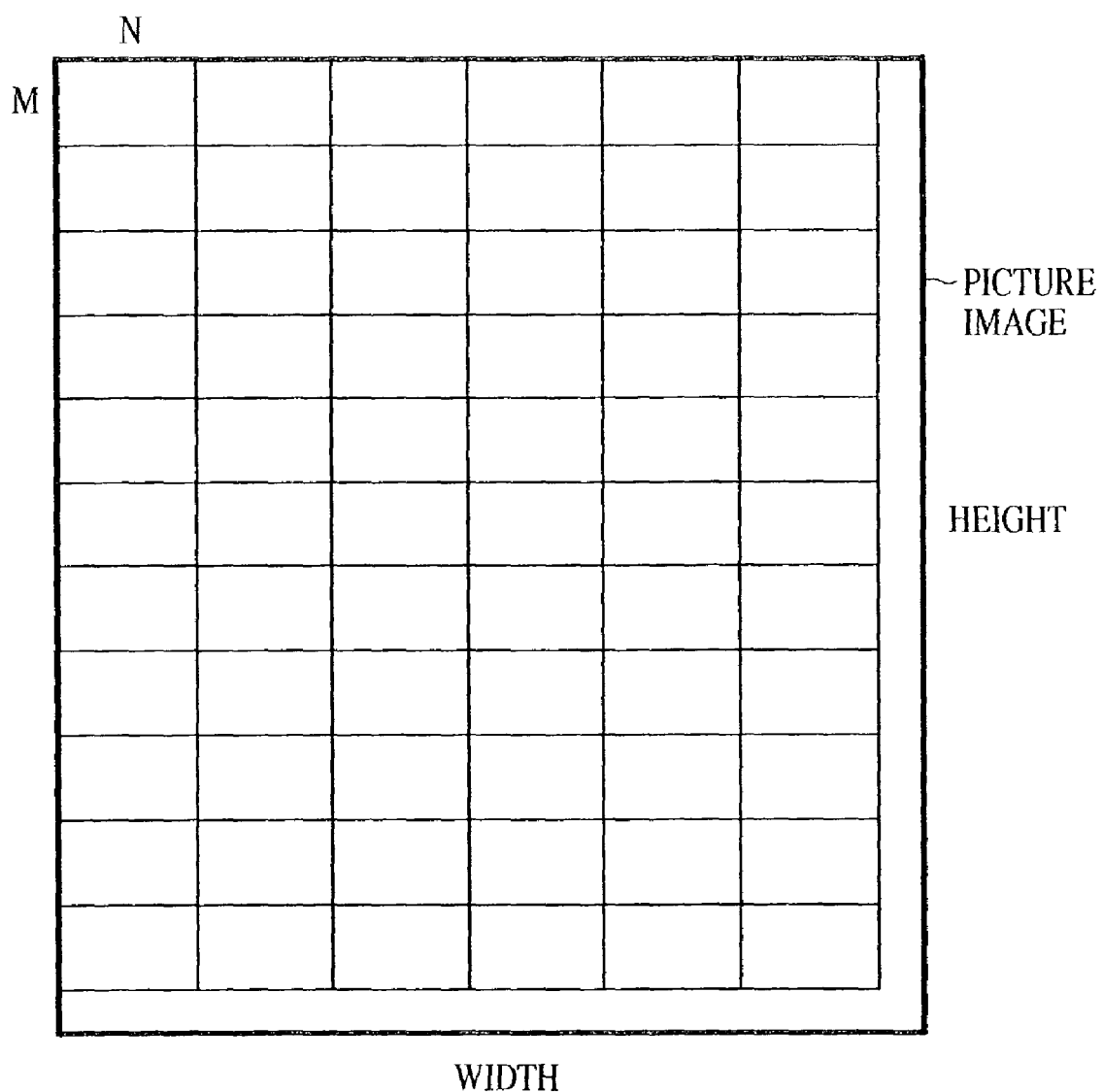
FIG. 5 shows one example of division into blocks.

A multiplexed area will now be described with reference to FIG. 5. FIG. 5 shows one picture image having the number of horizontal pixels WIDTH and the number of vertical pixels HEIGHT. It is here assumed that additional information is multiplexed in the picture image of FIG. 5. By setting an upper left end of the picture image as the origin, the image is divided into blocks each having N pixels in the horizontal direction and M pixels in the vertical direction. While division into blocks is made with the origin set to a reference point in this embodiment, a point away from the origin may be set to a reference point. When multiplexing a maximum amount of information in the picture image, each block of N×M pixels is arranged from the reference point in sequence. Thus, assuming that the number of blocks capable of being arranged in the horizontal direction is W and the number of blocks capable of being arranged in the vertical direction is H, the following relationships are obtained;

$$W = \text{INT}(\text{WIDTH}/N) \qquad \text{Eq. 1}$$

$$H = \text{INT}(\text{HEIGHT}/M) \qquad \text{Eq. 2}$$

where INT( ) represents an integer within ( ).

The numbers of pixels corresponding to the remainders resulting from the divisions in Eq. 1 and Eq. 2 represent end portions left after arranging a plurality of (N×M)-pixel blocks, i.e., an area outside a code multiplexed area.

Returning to FIG. 4, if it is determined in S404 that the target pixel currently under processing is outside the multiplexed area, a quantizing condition C is set in S405. On the other hand, if the target pixel is determined as being within the multiplexed area, additional information to be multiplexed is read. For simplicity of the explanation, it is assumed that the additional information is expressed on the 1-bit to 1-bit basis using an array code[ ]. For example, assuming the additional information to be 48-bit information, the array code[ ] is stored for each bit from code[0] to code[47].

In step S406, a variable bit is given by putting information within the array code[ ] as follows:

$$\text{bit} = \text{code}[\text{INT}(i/M) \times W + \text{INT}(j/N)] \qquad \text{Eq. 3}$$

Subsequently, it is determined in S407 whether the variable bit after putting the information is "1" or not. Since the information in the array code[ ] is stored for each bit as mentioned above, the variable bit also takes a value "0" or "1".

If the variable bit is determined as being "0" in S407, a quantizing condition A[col] is set in S408, and if it is determined as being "1", a quantizing condition B[col] is set in S409. The quantizing condition A[ ] and the quantizing condition B[ ] are each expressed using an array of a variable col indicating the number of colors. Thus, a factor as a part of each quantizing condition varies depending on the variable col. Details of the process of setting the quantizing condition will be described later.

Subsequently, in step S410, a quantizing process is executed based on the set quantizing condition. This quantizing process corresponds to the error diffusion process described above with reference to FIG. 3.

Then, a horizontal-direction variable j is counted up in S411, and it is determined in S412 whether a counted-up value is smaller than WIDTH, i.e., the number of horizontal pixels of the image. If so, the above-described processing is repeated until the number of processed pixels reaches WIDTH. When the processing in the horizontal direction is completed up to the number of pixels WIDTH, the variable col indicating the number of colors is counted up in S413, and it is determined in S414 whether a counted-up value is smaller than TOTAL_INK, i.e., the total number of colors to be processed. If so, the above-described processing is repeated until the number of processed colors reaches TOTAL_INK.

Further, when the processing in the horizontal direction is completed up to the number of pixels WIDTH for all colors, a vertical-direction variable i is counted up in S415, and it is determined in S416 whether a counted-up value is smaller than HEIGHT, i.e., the number of vertical pixels of the image. If so, the above-described processing is repeated until the number of processed pixels reaches HEIGHT.

With the operation described above, the quantizing condition can be changed in units of block made up of N×M pixels.

Examples of the quantizing conditions A, B and C will be described below. While there are various factors as the quantizing condition used in the pseudo gradation process, the quantizing condition is assumed to be a quantizing threshold in this embodiment. The quantizing condition C is used for the area outside the multiplexed area, and therefore may have any value as the quantizing threshold. As mentioned above, when one pixel is expressed with 8-bit gradations and a quantization level is given by a binary value, a maximum value "255" and a minimum value "0" are quantization representative values. An intermediate value "128" is then set as the quantizing threshold in many cases. Thus, the quantizing condition C is set such that the quantizing threshold is fixed to "128".

Since the quantizing conditions A and B are used for the blocks within the multiplexed area, they must be set so as to produce a difference in image quality depending on the difference between the conditions. On the other hand, an image must be expressed such that the difference in image quality is hard to discern visually and at the same time it can be easily discriminated from the on-paper information.

Figure 6B:
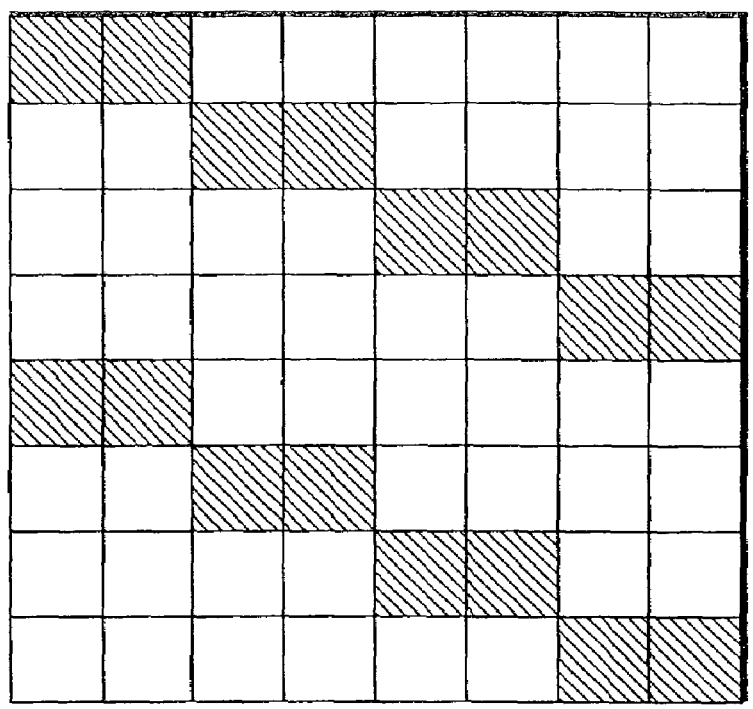
FIGS. 6A and 6B show examples of changes of a quantizing threshold in a quantizing condition.
Figure 6A:
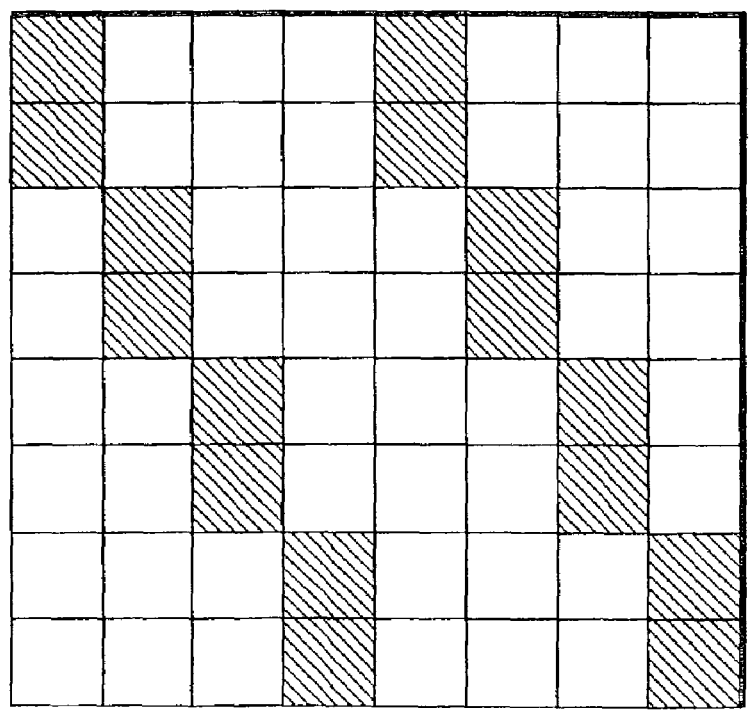

Examples of the quantizing conditions A and B are shown in FIGS. 6A and 6B. FIG. 6A shows a period at which the quantizing threshold in the quantizing condition A is changed. In FIG. 6A, it is assumed that one box represents one pixel, a white box represents a fixed threshold, and a gray box represents a varying threshold.

More specifically, in the example of FIG. 6A, a matrix of horizontal 8 pixels and vertical 8 pixels is prepared, and the threshold of only the gray boxes is set to a salient value.

Likewise, FIG. 6B shows a period at which the quantizing threshold in the quantizing condition B is changed. Also, in the example of FIG. 6B, a matrix of horizontal 8 pixels and vertical 8 pixels is prepared, and the threshold of only the gray boxes is set to a salient value.

In the case expressing one pixel with 8-bit gradation values as described above, it is assumed, by way of example, to set "128" as the fixed threshold and "10" as the salient threshold. With the quantizing threshold set to a lower value, the target pixel tends to more often take the quantized value "1" (quantization representative value "255"). Thus, in FIGS. 6A and 6B, the quantized value "1" tends to more often appear following the arrangement of the gray boxes in each drawing. Stated otherwise, for each block of N×M pixels, there appear in a mixed manner a block in which dots are generated at a higher probability following the arrangement of the gray boxes in FIG. 6A, and a block in which dots are generated at a higher probability following the arrangement of the gray boxes in FIG. 6B.

A slight change of the quantizing threshold in the error diffusion process does not impose a great effect upon the image quality. With the systematic dithering process, the image quality in gradated expression is greatly affected depending on a dither pattern used. With the error diffusion process in which the quantizing threshold is regularly changed as described above, however, the gradated expression determining the image quality is provided by the error diffusion process, and no significant effects are imposed on the image quality based on the gradated expression; namely, there occur neither a change in dot array nor a change in the occurrence of a texture. The reason is in that even when the quantizing threshold is changed, an error between the signal value and the quantized value is dispersed to peripheral pixels and the input signal value is macroscopically preserved. In other words, the error diffusion process has very large redundancy in dot array and occurrence of a texture.

This embodiment is featured in that, in each of the quantizing conditions A and B, a factor as a part of the quantizing condition is changed for each color component to be processed. The computation formula of the array code[ ] for determining the additional information bit in S406 of FIG. 4 does not include a parameter for the variable col indicating the color component. Thus, the factors determining the additional information bit are only based on the address coordinates of an image, and do not depend on the color component. Stated otherwise, the same additional information bit is expressed in the same coordinate area for all colors. Japanese Patent Laid-Open No. 4-294682 proposes a method of expressing additional information with yellow ink that is less visually prominent. However, the method of expressing additional information with a single color has a difficulty in adapting for image information at all levels of density, particularly, in a high density area. For that reason, in this embodiment, the additional information is expressed using all of the color components rather than using only one color component, although redundancy increases in the processing.

Differences in the quantizing condition for each color component will now be described with reference to FIGS. 7 and 8.

In this embodiment, an ink jet printer is assumed to employ six ink colors (cyan, light cyan, magenta light magenta, yellow and black). The light cyan and the light magenta are inks prepared using the same color materials as those of cyan and magenta, and differ from cyan and magenta just in that dyes serving as the color materials are diluted at different concentrations with respect to the total amount of water.

Figure 4:
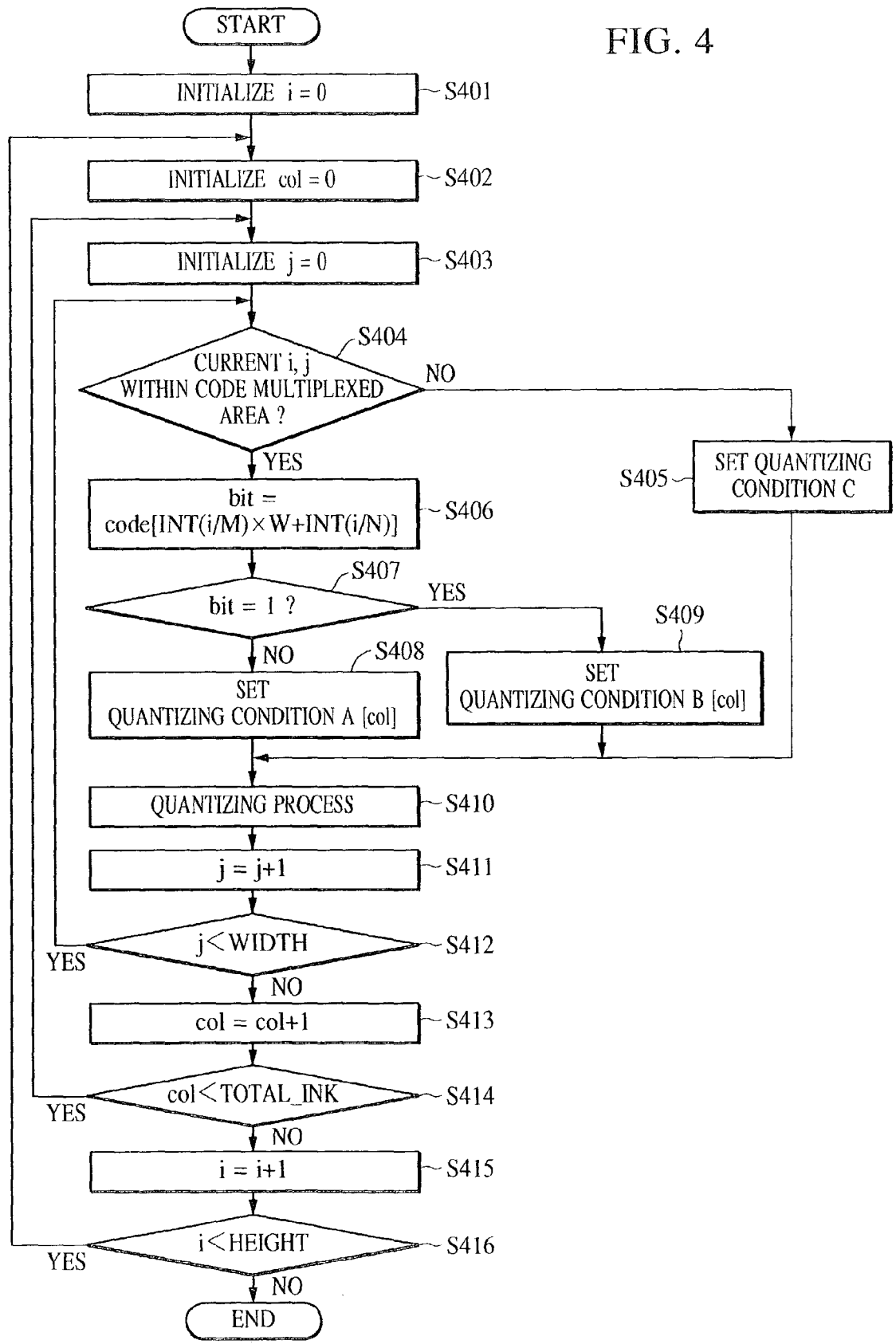
FIG. 4 is a flowchart showing operation of a multiplexing process including quantization control.
Figure 7:
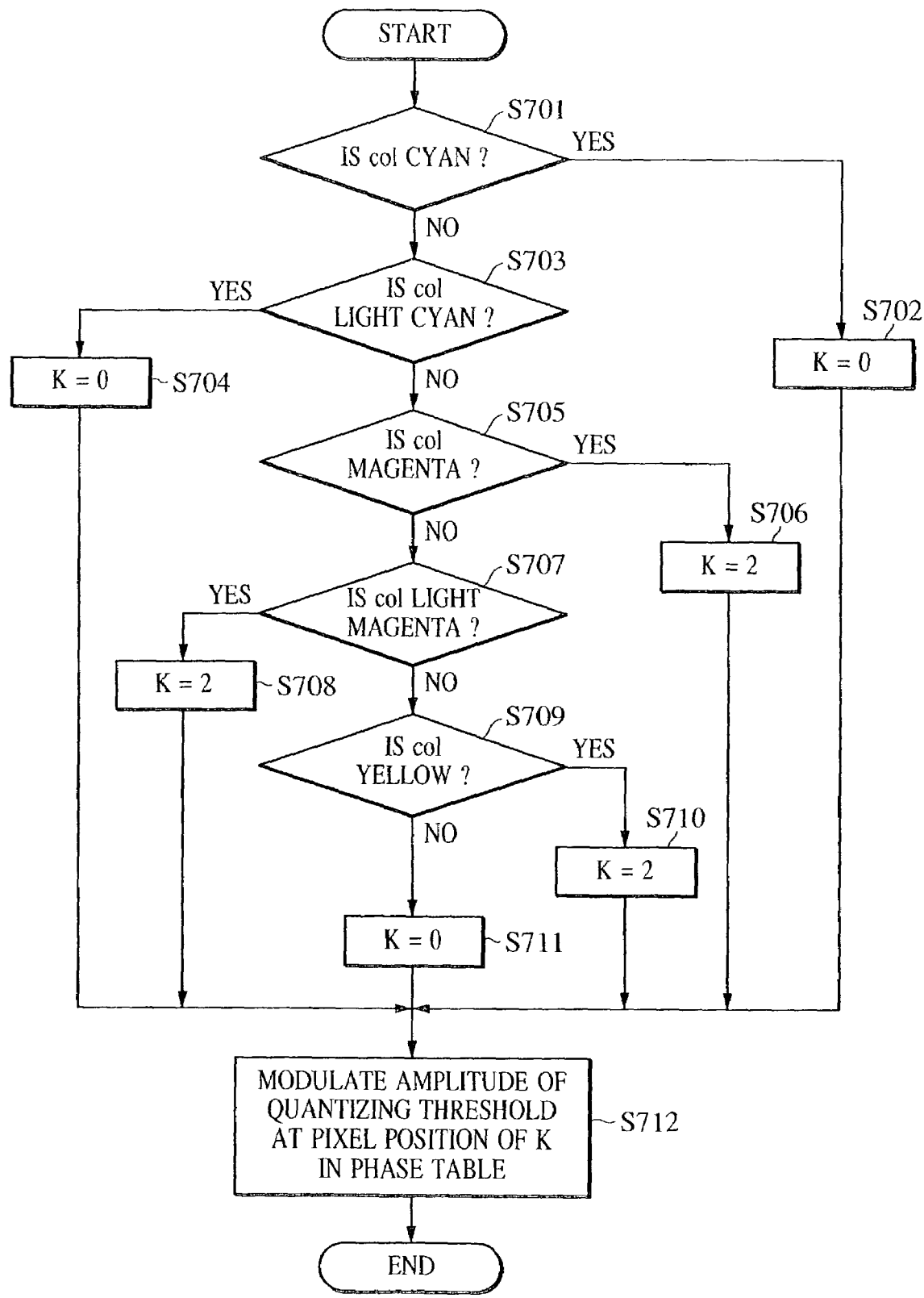
FIG. 7 is a flowchart showing operation of setting a phase per color in a quantizing condition controller in FIG. 2.

FIG. 7 shows steps of setting a different factor as a part of the quantizing condition A or B for each color component in S408 and S409 of FIG. 4.

Referring to FIG. 7, it is determined in S701 whether the color component col under processing is cyan. If it is cyan, a variable K regarding the phase, at which the quantizing threshold is amplitude-modulated, is set to 0 in S702. Similarly, whether the color component col under processing is light cyan is determined in S703, and whether it is magenta is determined in S705. Further, whether it is light magenta is determined in S707, and whether it is yellow is determined in S709.

If the determination result is light cyan, the variable K is set to 0 in step S704. If the determination result is magenta, the variable K is set to 2 in step S706. If the determination result is light magenta, the variable K is set to 2 in step S708. If the determination result is yellow, the variable K is set to 2 in step S710. If the determination result is a color component other than the above ones, i.e., black, the variable K is set to 0 in step S711.

When the value of the variable K is put, the amplitude of the quantizing threshold is modulated in step S712 at a pixel position where the variable K is set in a predetermined phase table that has been set beforehand. Assuming now that the modulated amplitude is C, the quantizing threshold before the modulation is TH, and the quantizing threshold after the modulation is TH', the following relationship is obtained:

$$TH'=TH-C \qquad \text{Eq. 4}$$

Thus, the quantizing process is executed using TH' as the quantizing threshold at the pixel position of the variable K in the phase table, and it is executed using TH in other pixel positions.

FIGS. 8A and 8B show phase tables for use in the amplitude modulation of the quantizing threshold. As with FIGS. 6A and 6B, one box represents one pixel. A numeral in the phase table corresponds to a value of the variable K.

FIG. 8A shows the phase table for the quantizing condition A, and FIG. 8B shows the phase table for the quantizing condition B. The phase tables of FIGS. 8A and 8B have respectively the same periodicity as that produced in FIGS. 6A and 6B.

Herein, the quantizing condition is made up of three factors, i.e., period (frequency), phase and amplitude, used for modulating the quantizing threshold. As described above, among those factors, the period differs between the quantizing condition A and the quantizing condition B. In this embodiment, additional information is expressed on printed-out paper based on such a difference in period. Moreover, in this embodiment, the factor phase is changed depending on the color component. More specifically, in the quantizing process for the color components of cyan, light cyan and black, the amplitude of the quantizing threshold is modulated at the pixel positions of "0" in the phase table of FIG. 8A (when the quantizing condition A is selected) or in the phase table of FIG. 8B (when the quantizing condition B is selected)

Also, in the quantizing process for the color components of magenta, light magenta and yellow, the amplitude of the quantizing threshold is modulated at the pixel positions of "2" in the phase table of FIG. 8A (when the quantizing condition A is selected) or in the phase table of FIG. 8B (when the quantizing condition B is selected).

By thus shifting the phase in modulation of the quantizing threshold per color in units of several pixels, overlaps between dots on paper occur at less probability.

While the phase table of 8×8 pixels is shown, phase control can be easily performed by repeatedly using that table at a period of 8×8 pixels.

It is not always required that the block size of the phase table matches with the block size representing one bit of the additional information, i.e., N×M pixels.

Further, while the above-described Eq. 4 defines the modulation of reducing the quantizing threshold, the modulation may be performed, for example, based on the following setting:

In the quantizing process for cyan, light cyan and black, $TH'=TH-C$ when K=0

$TH'=TH+C$ when K=2

In the quantizing process for magenta, light magenta and yellow, $TH'=TH+C$ when K=0

$TH'=TH-C$ when K=2    Eq. 5

The setting defined by Eq. 5 provides more preferable control and is more effective.

The additional information separator 105 will be described below.

Figure 9:
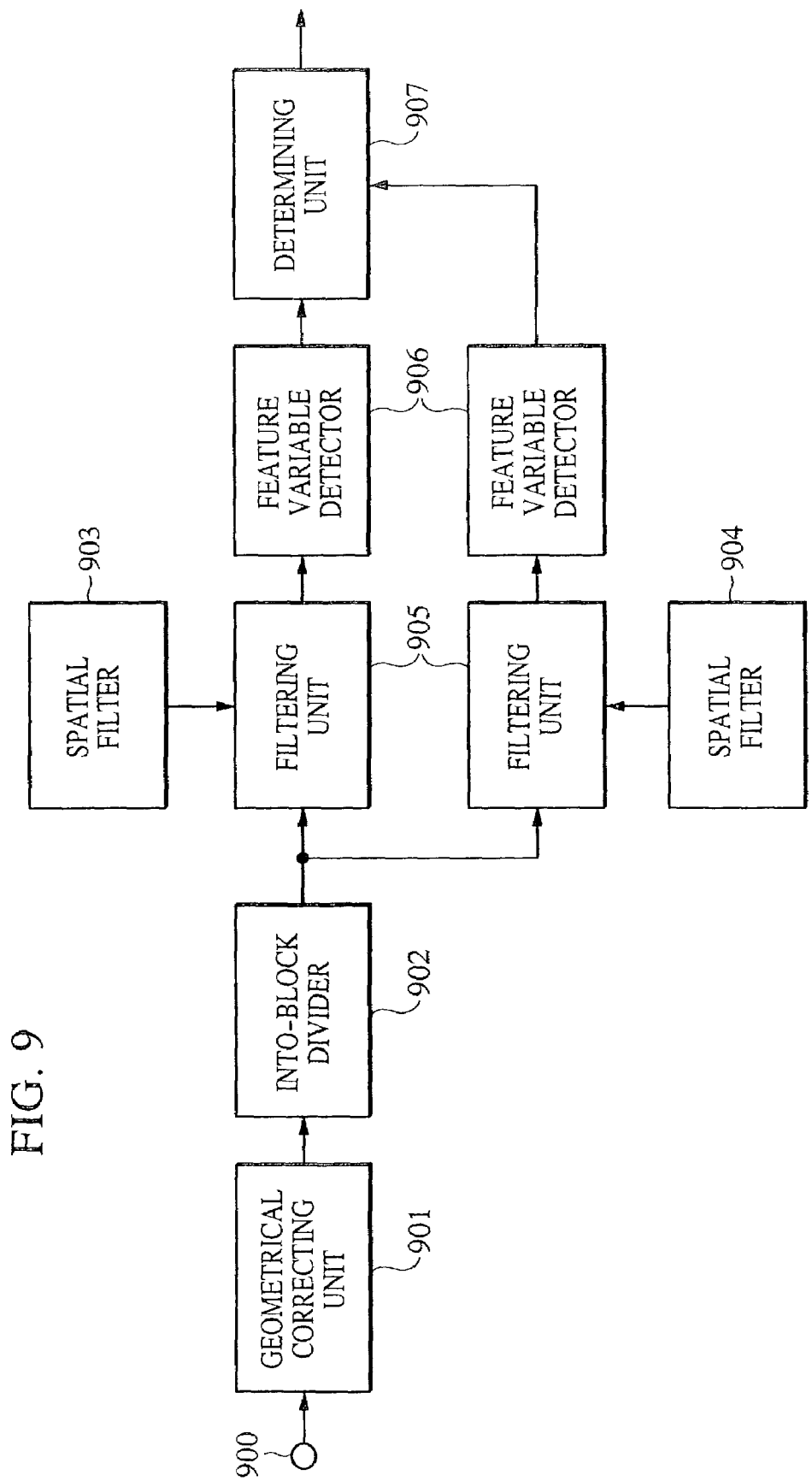
FIG. 9 is a block diagram showing a principal part of an additional information separator in FIG. 1.

FIG. 9 is a block diagram showing a configuration of the additional information separator 105.

Reference numeral 900 denotes an input terminal to which image information read by a scanner is input. The resolution of the scanner used is preferably comparable or superior to that of a printer used for outputting a print. To precisely read scattered dot information on the print, it is of course required from the sampling theory that the scanner side has the resolution twice or more that of the printer side. Though not so precisely, however, it is possible to recognize scattered dot information to a certain degree with a scanner having resolution comparable or superior to that of a printer. For simplicity of the explanation, it is assumed in this embodiment that the printer resolution is the same as the scanner resolution.

Numeral 901 denotes a geometrical deviation detector for detecting a geometrical deviation of an image input from the scanner. Because the image information sent from the scanner and received at the input terminal 900 has been subjected to steps of printer outputting and scanner inputting, it may sometimes occur that the received image information geometrically deviate from the image information before the printer outputting to a large extent.

Accordingly, the geometrical deviation detector 901 detect four corner points of the print at which the image information is expected to be printed. On an assumption that the printer resolution is the same as the scanner resolution, a major factor to be corrected is a rotational direction (inclination) of the printer, which depends on, e.g., a skew of paper on which the image information is printed by the printer, and a shift occurred when setting the print in the scanner. It is therefore possible to determine what extent of deviation is caused in which rotational direction, by detecting the four corner points of the print.

Numeral 902 denotes an into-block divider for dividing an image into blocks each being made up of P×Q pixels. This block must be smaller than the block of N×M pixels divided in the multiplexing process. Thus, there hold relationships of:

$P \leq N$ and $Q \leq M$    Eq. 6

Also, the division into blocks in units of P×Q pixels is performed while skipping a certain interval between the blocks. In other words, the division into blocks is made such that one block of P×x Q pixels is contained in an area corresponding to the block of N×M pixels divided in the multiplexing process. The number of pixels skipped is basically N pixels in the horizontal direction and M pixels in the vertical direction.

Numerals 903, 904 denote spatial filters A, B having different characteristics, and numeral 905 denotes a digital filtering unit for computing the sum of the products with respect to peripheral pixels. Each coefficient of the spatial filter is defined adaptively for the period of the varying threshold of the quantizing condition in the multiplexing process. It is here assumed here that additional information is multiplexed while the quantizing condition is changed in the multiplexer using two types of periodicity shown in FIGS. 6A and 6B. FIGS. 10A and 10B show examples of the spatial filter A 903 and the spatial filter B 904 that are used in the separator on that assumption.

Referring to FIGS. 10A and 10B, the center in 5×5 pixels represents a target pixel, and other 24 pixels represent peripheral pixels. A blank pixel in FIGS. 10A and 10B indicates that the filter coefficient is "0". As seen from the drawings, the filters shown in FIGS. 10A and 10B are edge-emphasizing filters. In addition, the emphasized edge direction is matched with the direction of the varying threshold in the multiplexing process. In other words, FIGS. 10A and 10B are formed in a matched relation to FIGS. 6A and 6B, respectively. Thus, each spatial filter is constituted as a BPF (band-pass filter) for emphasizing the produced periodic band.

Numeral 906 denotes a feature variable detector serving to detect any feature variable based on converted values after being subjected to filtering in the filtering unit 905 with the aid of the spatial filter A 903 and the spatial filter B 904. Conceivable examples of the feature variable to be detected are given below;

1. a maximum one of the converted values within a block after digital filtering,
2. a difference between a maximum one and a minimum one of the converted values within a block after digital filtering, and
3. a dispersion value of the converted values within a block after digital filtering.

In this embodiment, the dispersion value indicated by above 3 is employed as the feature variable.

Numeral 907 denotes a determining unit for comparing respective magnitudes of the dispersion values with each other and determining a larger one of the dispersion values to be indicative of a code. More specifically, when the dispersion value after filtering of the spatial filter A is larger, it is estimated that the image information has been quantized with the quantizing condition A in the printing process. On the contrary, when the dispersion value after filtering of the spatial filter B is larger, it is estimated that the image information has been quantized with the quantizing condition B in the printing process.

Because the quantizing condition is linked with the code (bit in Eq. 3) of the additional information, recognition of the quantizing condition means that the multiplexed code can be specified. In other words, when the quantizing condition A is estimated, the code can be determined to be bit=0, and when the quantizing condition B is estimated, the code can be determined to be bit=1.

While this embodiment has been described above, this embodiment is featured in changing the quantizing condition for the error diffusion process in the multiplexing step so that the phase in modulation of the quantizing threshold is shifted for each color when predetermined periodicity is produced for expressing the additional information. More specifically, assuming that six ink colors are printed on paper, the following defects are caused if the modulation is performed at exactly the same phase for all six colors:

Because a probability of overlaps between dots in respective colors increases, the modulated periodicity is emphasized to be visually perceived with more ease, and noises felt on paper are increased.

Because a probability of overlaps between dots in respective colors increases, color development deteriorates.

Because a probability of overlaps between dots in respective colors increases, ink is apt to spread over paper if it is used, and a difficulty rises in demultiplexing of additional information depending on the kind of paper.

If the modulation is performed at the same phase, regular noises of a low-frequency component for each color cannot be visually concealed. In other words, it is impossible to fill gaps with inks of plural colors and to provide the superimposing action so that the modulation appears as a high-frequency component from the point of visual sense.

The above-mentioned defects can be overcome by changing the phase in modulation of the quantizing threshold depending on color.

Thus, changing the phase is effective in both improving the image quality on paper and increasing the demultiplexing capability.

However, the change in phase requires to be set an optimum one based on experiments.

For example, a dense ink and a light link made of the same color material are preferably modulated at the same phase. The reason is in that when those inks are modulated at different phases, the deviation produced to express the additional information is reduced with a phase shift and demultiplexing is difficult to achieve in some cases. Also, when inks are made of different color materials, there is no problem if ink colors are perfectly in a complementary relation with respect to an RGB filter used in the scanner. However, there are neither such an ideal filter nor such an ideal ink, and not a few crosstalk component occurs in spectroscopic distribution between colors. For that reason, the color components, between which a large crosstalk has been experimentally confirmed, are preferably modulated at the same phase.

While this embodiment has been described, by way of example, in connection with the case of employing inks in six colors, the number of ink colors may be of course larger or smaller than six.

Further, as a matter of course, this embodiment is adaptable for color components based on other color spaces.

With the first embodiment, as described above, a color image is input and the input color image is quantized with the error diffusion process for each of predetermined colors (cyan, light cyan, magenta, light magenta, yellow and black). Periodicity in modulating the amplitude of a quantizing threshold is controlled depending on predetermined information to be buried in the image. For at least one of the color components, the phase in modulating the amplitude of the quantizing threshold is controlled to be different from the phase for the other color components. As a result, noises felt on paper and deterioration of image quality can be suppressed, and a capability of extracting additional information from a print can be increased.

Second Embodiment

Figure 11:
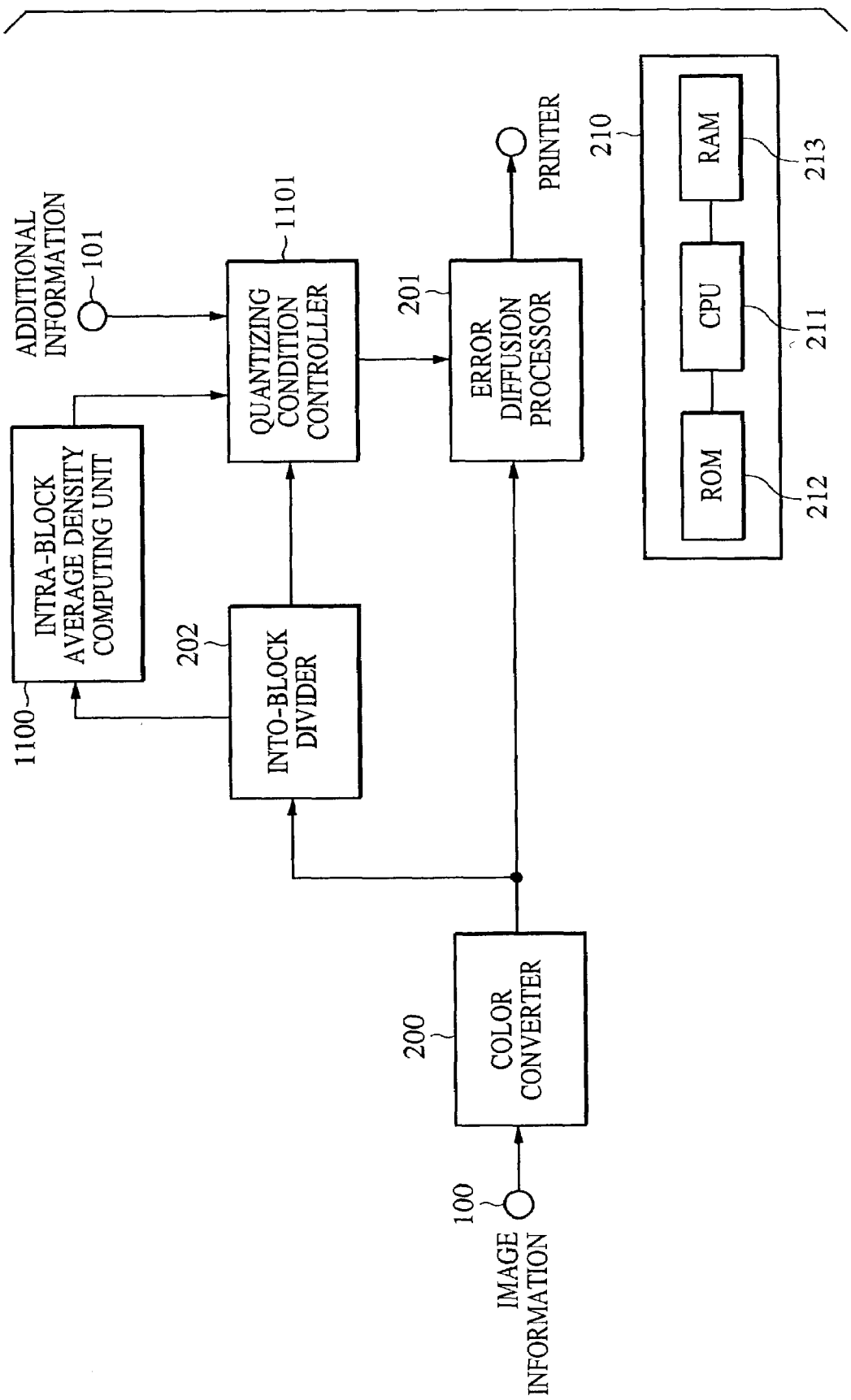
FIG. 11 is a block diagram showing a principal part of an additional information multiplexer according to a second embodiment of the present invention.

FIG. 11 is a block diagram showing a configuration of an additional information multiplexer according to a second embodiment of the present invention. The additional information multiplexer shown in FIG. 11 partly differs from that shown in FIG. 2. Therefore, the same components are denoted by the same numerals, and the following description is made of only the different points.

Referring to FIG. 11, an intra-block average density computing unit 1100 computes an average density of a particular color within a block of N×M pixels, which expresses one bit of additional information. Information of the computed average density is transmitted to a quantizing condition controller 1101 which controls a quantizing threshold in a similar manner to the first embodiment described above.

A process of deciding the quantizing condition A or the quantizing condition B in the quantizing condition controller 1101 is similar to that shown in FIG. 4, and hence a description of the process is omitted here. In this embodiment, the computed average density within the block is used for deciding the phase at which the amplitude of quantizing threshold is modulated for each color component.

Figure 12:
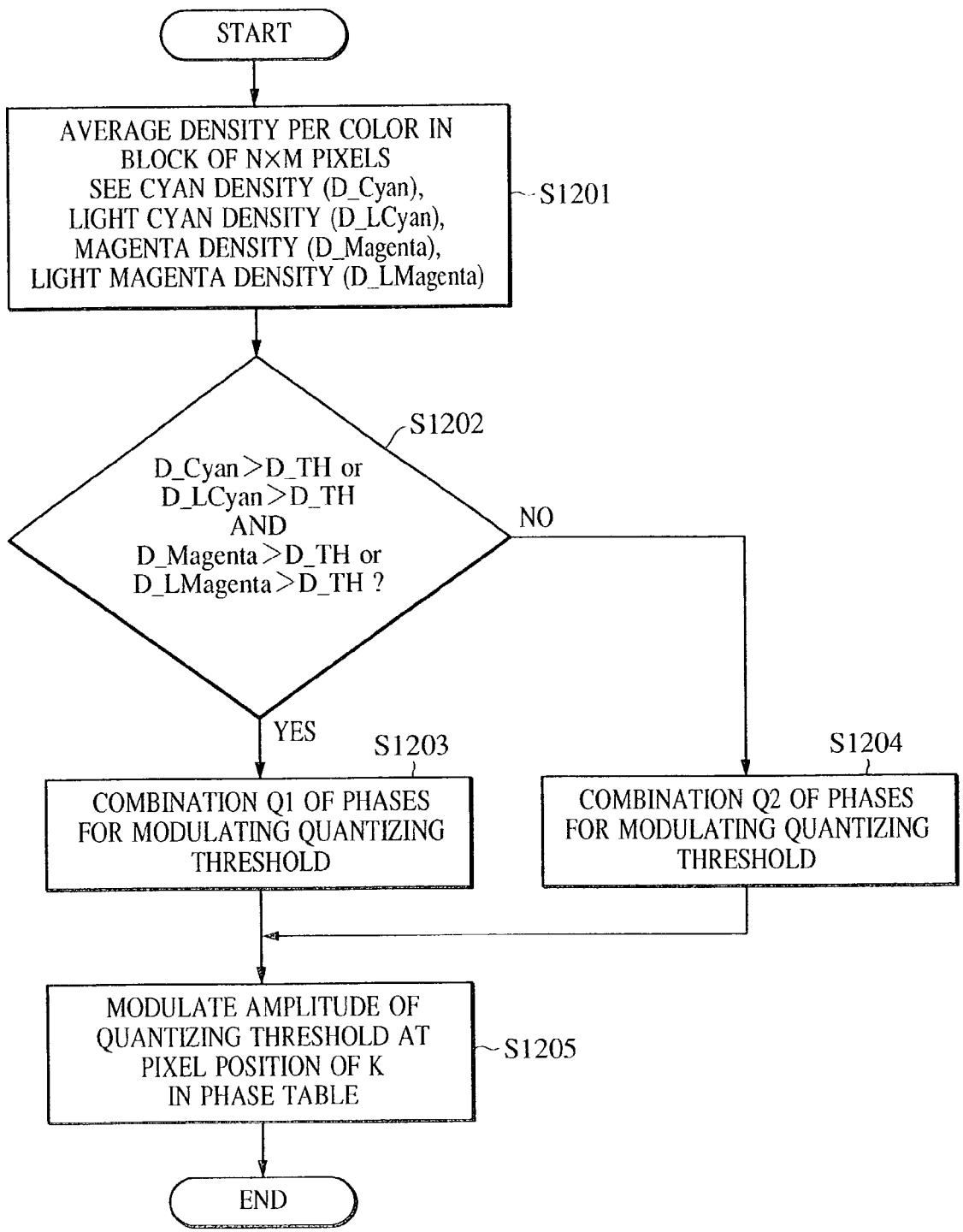
FIG. 12 is a flowchart showing operation of setting a combination of phases per color in a quantizing condition controller in FIG. 11.
Figure 13:
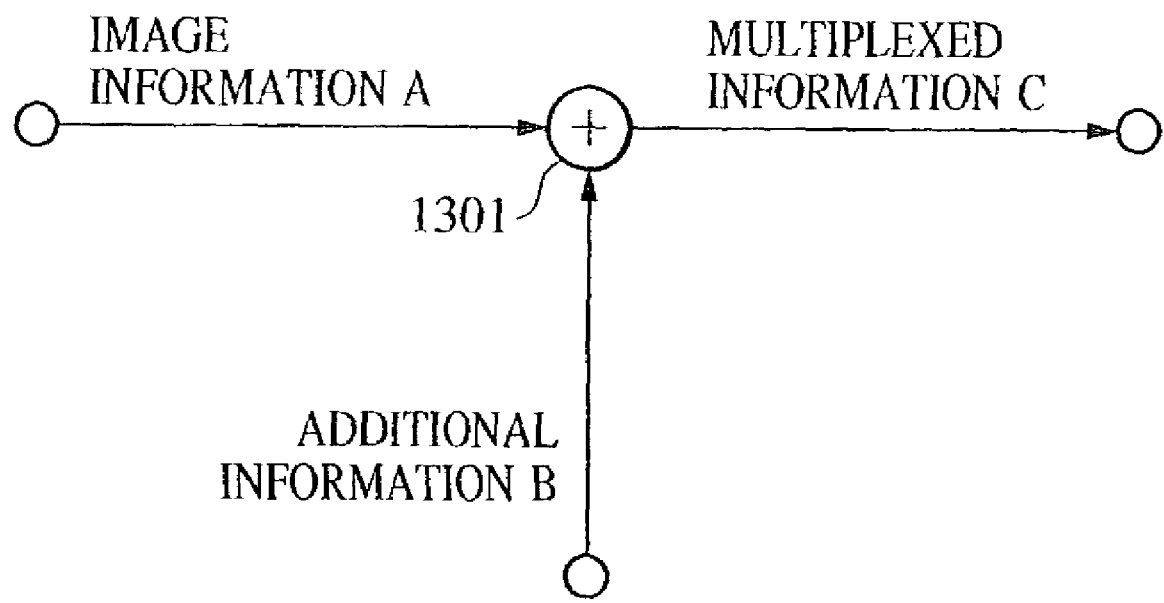
FIG. 13 is a block diagram showing one example of multiplexing of additional information according to a conventional method.
Figure 14:
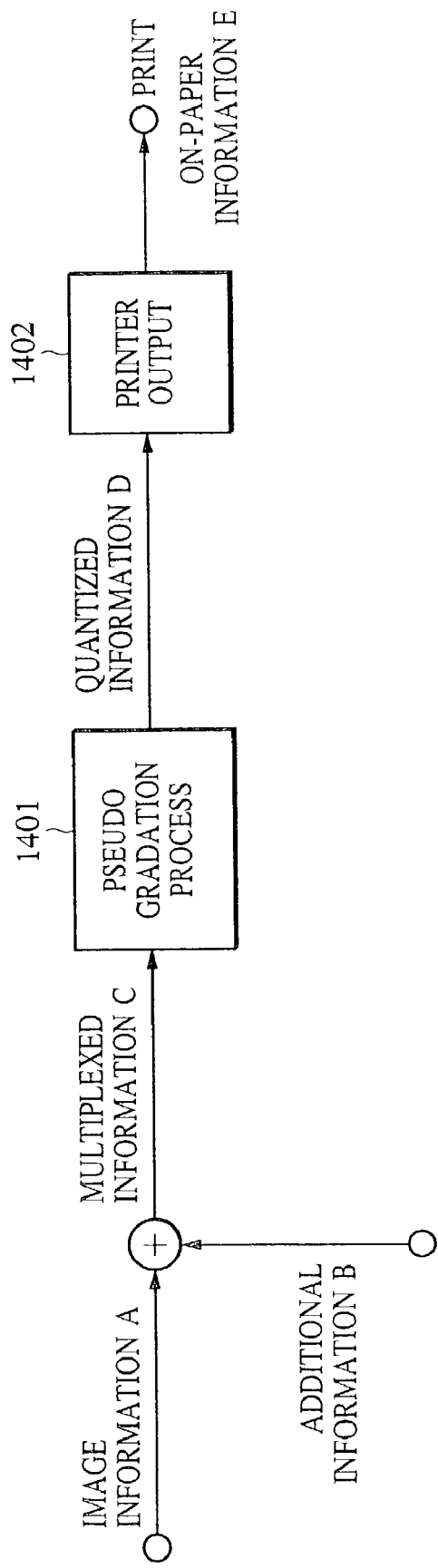
FIG. 14 is a block diagram showing another example of multiplexing of additional information according to a conventional method.
Figure 15:
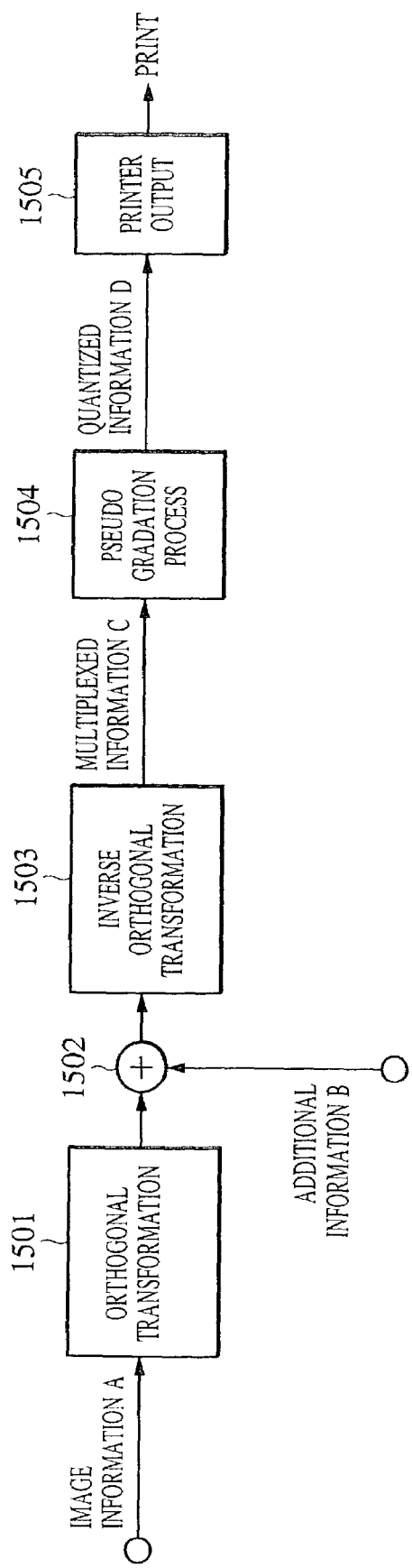
FIG. 15 is a block diagram showing still another example of multiplexing of additional information according to a conventional method.
Figure 16:
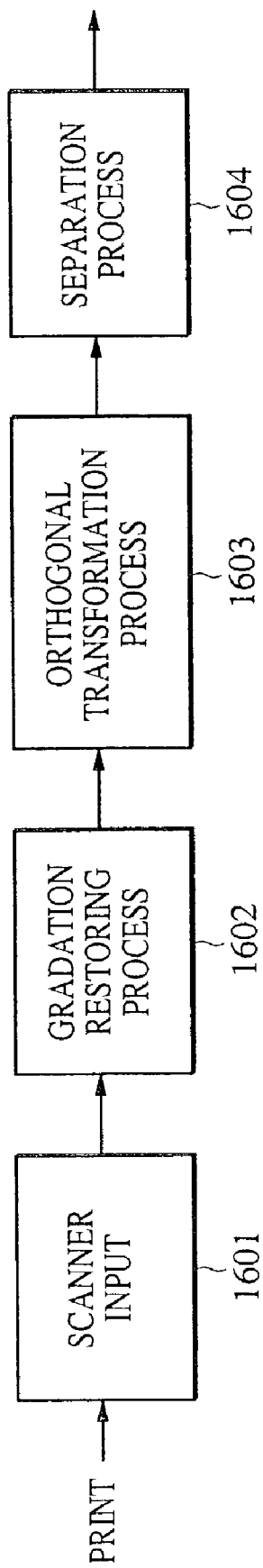
FIG. 16 is a block diagram showing one example of separation of additional information according to a conventional method.

FIG. 12 shows steps of setting a different phase as the quantizing condition A or B for each color component in S408 and S409 of FIG. 4.

Referring to FIG. 12, in step S1201, the average density computed by the intra-block average density computing unit 1100 is referred to. Respective average densities of cyan, light cyan, magenta and light magenta are assumed to be D_Cyan, D_LCyan, D_Magenta and D_LMagenta.

Subsequently, the following determination is made in S1202;

(D_Cyan>D_TH or D_LCyan>D_TH) and (D_Magenta>D_TH or D_LMagenta>D_TH)     Eq. 7 where D_TH is a preset threshold.

Eq. 7 represents determination as to whether the average density of cyan or light cyan and the average density of magenta or light magenta are both high. In other words, it is determined whether an amount of ink printed in the block is large.

If the amount of ink printed is large for both the cyan-based and magenta-based inks, a combination Q1 of phases for modulating the quantizing threshold is selected in S1203, and if not so, a combination Q2 of phases for modulating the quantizing threshold is selected in S1204. The combinations Q1, Q2 are each made up of K values for respective colors and are given as follows:

Q1: cyan, light cyan . . . K=0
    Magenta, light magenta . . . K=2
    Yellow, black . . . K=1
Q2: cyan, light cyan . . . K=0
    Magenta, light magenta . . . K=0
    Yellow, black . . . K=1

After the phase combination is decided, the amplitude of the quantizing threshold is modulated in S1205 at the pixel position of K in a phase table. The amplitude modulation is performed in a similar manner to that in the above first embodiment, and hence a description thereof is omitted here.

This embodiment is featured in a method of deciding the phase by referring to the densities of other color components. More specifically, for a block in which ink is printed in a larger amount, the modulation phase is shifted so that dots are printed in a dispersed manner and are kept from overlapping with each other and spreading over paper. Also, for a block in which ink is printed in a smaller amount, the modulation is controlled to be performed at the same phase so that the demultiplexing capability will not be adversely affected by a crosstalk component occurred in spectroscopic distribution between the cyan-based inks and the magenta-based inks.

By thus referring to the densities of other color components, finer control can be achieved.

The combinations Q1 and Q2 are employed merely by way of example, and the present invention is not limited to those combinations. Also, the number of combinations may be three or more.

While the average density within the block is computed for only four cyan-based and magenta-based colors, the present invention is not limited to that embodiment. The number of colors, for which the average density is computed, may be less than or more than four.

Further, while the additional information multiplexer and the additional information separator have been described above, the present invention is not limited to such a combination.

With the second embodiment, as described above, the density of a color image for each color component is determined, and the phase in the amplitude-modulation of the quantizing threshold is set depending on a determination result. As a result, noises felt on paper and deterioration of image quality can be suppressed, and a capability of extracting additional information from a print can be increased.

Other Embodiments

The present invention is applicable to not only a system comprising plural pieces of equipment (such as a host computer, interface units, a reader and a printer), but also an apparatus comprising a single piece of equipment (such as a copying machine or a facsimile).

The object of the present invention can also be achieved by supplying a storage medium (or a recording medium), which stores program codes of software for realizing the functions of the above-described embodiments, to a system or an apparatus, and causing a computer (CPU or MPU) in the system or the apparatus to read and execute the program codes stored in the storage medium. In that case, the program codes read out of the storage medium serve in themselves to realize the functions of the above-described embodiments, and hence the storage medium storing the program codes constitutes the present invention. Also, the functions of the above-described embodiments are realized not only by a computer executing the program codes read out of the storage medium, but also by an Operating System (OS) or the like which is working on the computer and executes a part or the whole of the actual processing in accordance with instructions from the program codes, thereby realizing the functions of the above-described embodiments.

Further, the present invention involves such a case in which the program codes read out of the storage medium are written in a memory provided in a function add-on card inserted in the computer or a function add-on unit connected to the computer, and a CPU or the like incorporated in the function add-on card or unit executes a part or the whole of the actual processing in accordance with instructions from the program codes, thereby realizing the functions of the above-described embodiments.

According to the present invention, as described above, a burying method and an extracting method are realized which are applied to a process of burying additional information in image information by utilizing changes in the occurrence of a texture produced with changes of the quantizing condition in an error diffusion process, and which can avoid deterioration of image quality caused upon burying of additional information from being visually recognized, and can easily extract the buried additional information. Also, in the case using a color printer, by shifting the phase in modulation of the quantizing threshold for each color, noises felt on paper and deterioration of image quality can be suppressed, and a capability of extracting the additional information from a print can be increased.

Further, according to the present invention, since multiplexing of additional information in image information can be easily realized, it is possible to provide services or applications for burying voice information or secret information in the image information. Additionally, the present invention is effective in preventing fraudulent forging of paper money, stamps, stocks and bonds, etc., and obviating infringement of the copyright of image information.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus for burying predetermined information in a color image, comprising:
    input means for inputting a color image;
    quantizing means for quantizing the input color image with an error diffusion process for each of predetermined color components; and quantizing condition control means for controlling, in accordance with the predetermined information, periodicity at which an amplitude of a quantizing threshold is modulated by said quantizing means, said quantizing condition control means controlling a phase in the amplitude modulation of the quantizing threshold to be different between at least one of the color components and the other color components.

2. An image processing apparatus according to claim 1, wherein said color components are color components corresponding to color materials used for forming the color image.

3. An image processing apparatus according to claim 2, wherein said phase is not made different between the color components corresponding to color materials which are formed of the same dye or the same pigment and prepared by varying a dye concentration or a pigment concentration.

4. An image processing apparatus according to claim 1, wherein said quantizing condition control means controls setting of said phase in accordance with a result of determining a density of the input color image for each color component.

5. An image processing method for burying predetermined information in a color image, comprising the steps of:
an input step of inputting a color image;
a quantizing step of quantizing the input color image with an error diffusion process for each of predetermined color components; and
a quantizing condition control step of controlling, in accordance with the predetermined information, periodicity at which an amplitude of a quantizing threshold is modulated in said quantizing step,
said quantizing condition control step controlling a phase in the amplitude modulation of the quantizing threshold to be different between at least one of the color components and the other color components.

6. A program embodied in a computer-readable medium, comprising computer-readable code for causing a computer to perform steps implementing an image processing method according to claim 5.

7. A computer-readable storage medium product storing computer-readable code for a program according to claim 6.

* * * * *

UNITED STATES PATENT AND TRADEMARK OFFICE
CERTIFICATE OF CORRECTION

| | |
|---|---|
| PATENT NO. | : 7,072,522 B2 |
| APPLICATION NO. | : 10/246536 |
| DATED | : July 4, 2006 |
| INVENTOR(S) | : Nobutaka Miyake et al. |

Page 1 of 1

It is certified that error appears in the above-identified patent and that said Letters Patent is hereby corrected as shown below:

ON THE TITLE PAGE, AT ITEM (56), RC:
U.S. Patent Documents, "2002/0080027" should read --2002/0080227--.

COLUMN 11:
Line 4, "that" should read --those--.

COLUMN 12:
Line 13, "detect" should read --detects--.

COLUMN 14:
Line 5, "component occurs" should read --components occur--.

Signed and Sealed this

Twenty-ninth Day of May, 2007

JON W. DUDAS
*Director of the United States Patent and Trademark Office*